March 15, 1966  A. P. JOHNSTON  3,240,233
GUIDING CONDUIT FOR WIRE OR THE LIKE
Filed Feb. 12, 1962  2 Sheets-Sheet 1

INVENTOR.
ARCHIBALD P. JOHNSTON
BY FULWIDER, MATTINGLY
& HUNTLEY

ATTORNEYS

March 15, 1966   A. P. JOHNSTON   3,240,233
GUIDING CONDUIT FOR WIRE OR THE LIKE
Filed Feb. 12, 1962   2 Sheets-Sheet 2
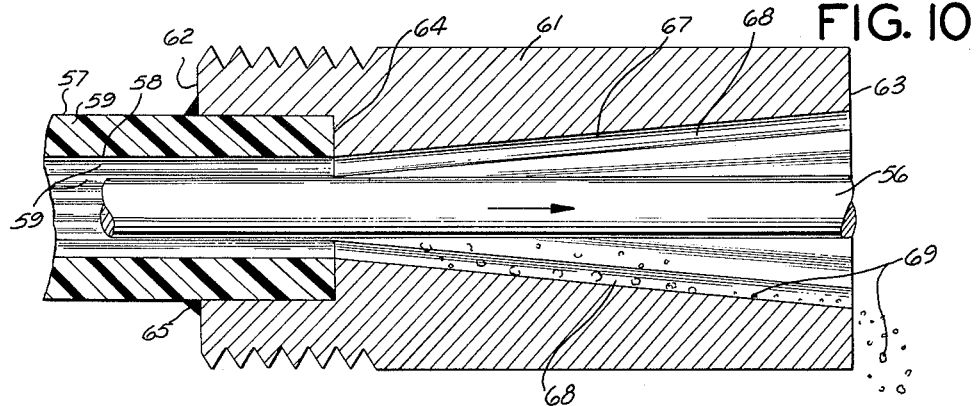
FIG. 10
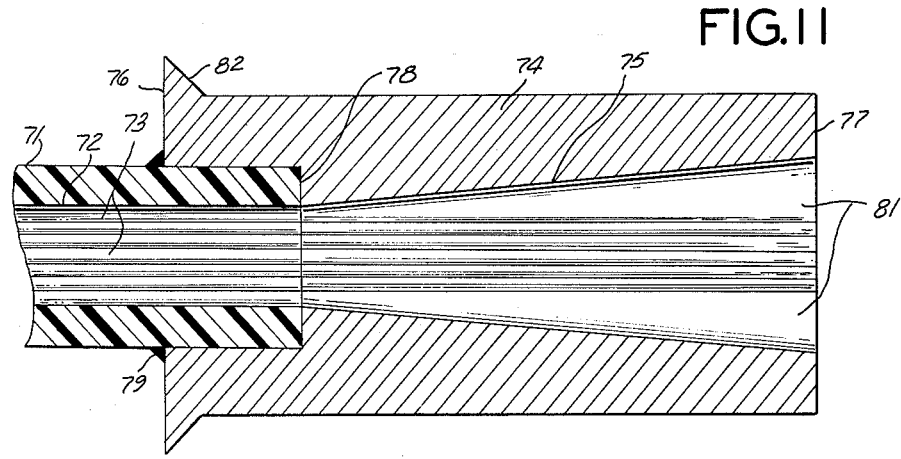
FIG. 11
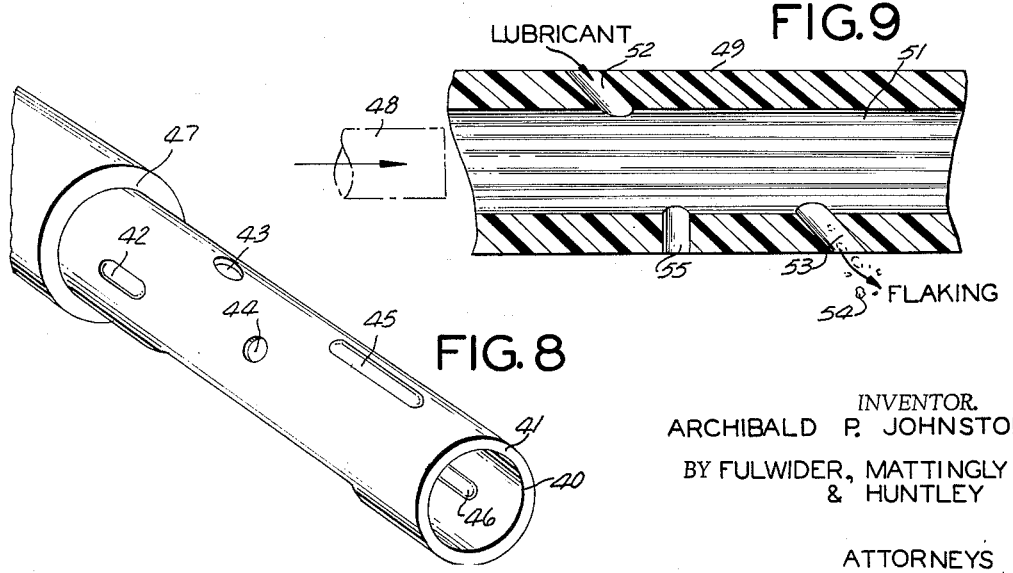
FIG. 9
FIG. 8
INVENTOR.
ARCHIBALD P. JOHNSTON
BY FULWIDER, MATTINGLY
& HUNTLEY
ATTORNEYS United States Patent Office 3,240,233
Patented Mar. 15, 1966

3,240,233
GUIDING CONDUIT FOR WIRE OR THE LIKE
Archibald P. Johnston, 1845 E. 57th St.,
Los Angeles 58, Calif.
Filed Feb. 12, 1962, Ser. No. 172,679
4 Claims. (Cl. 138—108)

This invention relates generally to devices for conveying wire or like material between selected locations and, more particularly, to a new and improved guiding conduit for directing such material from a source station to a utilization or storage station.

The problem of guiding wire, rods, tubes, cable or like material between a plurality of selected locations is one which has been encountered in many areas of technology, including the fields of welding and mechanical controls. In the latter field, namely that of mechanical controls, flexible shaft arrangements have frequently been used to facilitate the positioning of mechanical elements from remote locations. In the welding field, flexible liners or sleeves are commonly employed to conduct a welding filler metal from a supply station to a welding station.

A common embodiment of the flexible shaft controls being presently used involves the incorporation of a wire or rod-like control member, usually of metal, within a guiding sleeve or liner of metal, plastic or the like. The guiding sleeve is frequently maintained in a fixed position and extends from the control station location directly to the site of the mechanical element being controlled. In this manner, any movement of the control member within the guiding sleeve is imparted directly to the remote mechanical element, whereby the position of the mechanical element may be controlled.

It will be appreciated that the aforedescribed mechanical control arrangement depends for its effectiveness upon smooth, unimpeded action between the control member and the guiding sleeve. In this regard, the materials from which the guiding sleeve and control member are fabricated are selected for their low friction characteristics. Moreover, the internal configuration of the guiding sleeve corresponds in shape to that of the control member and is usually sized to provide a close fit for guiding accuracy.

Unfortunately, such flexible shaft devices are still plagued by a number of problems which eventually prove detrimental to the freedom of relative motion between the control member and the guiding sleeve. Such difficulties are encountered primarily in the way of flaking of material from either the control element, the sleeve, or both of these elements. These flakes of material or other foreign matter ultimately build up to the point where they clog the guiding sleeve and thereby cause the control member to jam or bind.

Moreover, the flexible shaft arrangements heretofore available have made no provisions for preventing rotation of the control member about its own longitudinal axis within the sleeve. Such rotation significantly increases the areas of frictional contact between the control member and the sleeve, with the end result that flaking of material and its consequent deleterious effects are even further aggravated.

One solution which has been suggested to the clogging and jamming problems has been to provide a guiding sleeve which is substantially oversized with respect to the control member to provide clearance for loose particles. Unfortunately, the latter arrangement suffers from additional difficulties in that there is a tendency for the control member to buckle within such a guiding sleeve, especially where the path traversed by the arrangement includes a considerable number of bends.

The aforedescribed difficulties regarding the movement of a control member within a guiding sleeve are equally applicable to the welding field, wherein it is desired to flexibly conduct a welding filler metal in wire form from a wire supply, wire straightener or feed rolls to a hand or machine-held device for cutting, melting, or electrically contacting the wire. A common expedient for accomplishing this has been to use a plastic liner as a guiding conduit for the welding wire, substantially in the same manner as described supra in regard to mechanical control elements. However, the flaking problem takes on even greater significance in the welding field, since such flaking may introduce electrical contacting problems during the welding process.

Accordingly, it is an object of the present invention to provide a new and improved guiding conduit for wire or the like which overcomes the above and other disadvantages of the prior art.

Another object is to provide a guiding conduit in which flaking and consequent conduit clogging are minimized.

A further object of the invention is the provision of a guiding conduit which reduces the areas of frictional contact between the conduit and the material conveyed therethrough.

Still another object is to provide a guiding conduit for wire or like material wherein the tendency of the material conveyed to rotate about its longitudinal axis is materially reduced.

Yet another object of the present invention is the provision of an improved wire conduit having an internal configuration which reduces driving effort and facilitates tracking of the wire as it passes through the conduit.

A still further object of the present invention is to provide a conduit in which the removal of debris and application of a lubricant is greatly facilitated.

Another object is the provision of a guiding conduit for welding material whirh embodies an improved termination nozzle for discharging the welding material.

Still another object is to provide a guiding conduit for welding filler material which enables a shielding or combustion gas to be supplied to the discharge area through the conduit.

The above and other objects of this invention will be better understood by reference to the following detailed description when considered in connection with the accompanying drawings wherein:

FIGURE 8 is a perspective view of an additional guiding conduit structure encompassed by the invention;

FIGURE 9 depicts, in section, a guiding conduit embodying novel flake elimination and lubrication intake openings in accordance with the present invention;

FIGURE 10 is a sectional view of a termination arrangement for the conduit of the instant invention and illustrates the structure of one form of a suitable discharge nozzle for such a conduit; and FIGURE 11 is a sectional view of a guiding conduit termination embodying an alternate discharge nozzle configuration in accordance with the present invention.

Figure 1:
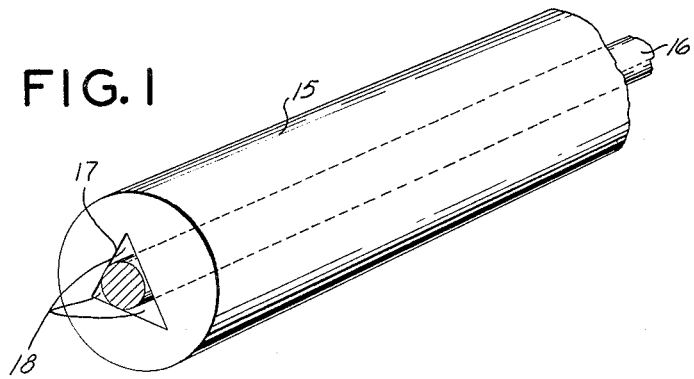
FIGURE 1 is a perspective view of one embodiment of the wire guiding conduit of the present invention and illustrates the orientation of the wire within the conduit aperture.

Referring now to the drawings, and particularly to FIGURE 1 thereof, there is shown a cylindrical guiding conduit 15, in accordance with one embodiment of the invention, having a round wire 16 positioned therein. The term "wire," as used throughout this specification, is deemed to include wire, rods, tubes, cable, strands or like material, and the invention is to be considered in no way limited to wire per se.

The conduit 15 is provided with a central aperture 17 which traverses the entire length of the conduit to permit the wire 16 to enter the conduit from one end and be guided therethrough to the other end of the conduit. The conduit is preferably fabricated of a plastic material, such as nylon, Teflon, or the like, but other materials may be suitably employed. In this regard, the choice of fabricating material is governed by the facility with which the chosen material may be worked into the desired conduit configuration, as well as the compatibility of the conduit material with that of the wire for freedom of relative flow, i.e., a low coefficient of friction between the conduit and the wire. In addition, there may be flexibility and minimal memory requirements depending upon the ultimate use to which the conduit is to be put. Furthermore, although the guiding conduit 15 is illustrated in FIGURE 1 as having an outer configuration which is circular, it is to be understood that this outer conduit configuration may assume any desired shape without in any way affecting the wire guiding capabilities of the conduit through the internal aperture 17.

Since the wire 16 in FIGURE 1 possesses a circular cross-section, the configuration of the aperture 17 must, in accordance with the present invention, assume a non-circular configuration. By way of example, the cross-sectional shape of the aperture 17 in FIGURE 1 is shown as triangular. Moreover, the cross-section of the aperture 17 is sized to provide a small degree of clearance space for the wire 16 within the conduit 15.

Several advantages accrue from the aforedescribed provision of a slightly oversized, noncircular aperture within a conduit for guiding round wire, as opposed to the heretofore conventional use of closely sized circular apertures for guiding round wire. In this regard, because of the difference in shape between the conduit aperture and the wire, the areas of frictional contact between them are reduced. This reduction in the frictional forces which would tend to impede the movement of the wire within the conduit serves to substantially reduce the driving effort required to propel the wire along the conduit.

Moreover, the discretely divided surfaces which form the aperture 17 and surround the wire 16, create a plurality of spaces or grooves 18, i.e., as at the corners of the triangular aperture 17. There is a tendency for the wire 16 to "track" within one or more of these grooves 18 while the wire is being pushed or pulled through the conduit and, consequently, this tracking introduces a substantial resistance to rotation of the wire about its own axis.

The reduction in areas of frictional contact, as well a enhanced resistance to wire rotation, also lessens the extent of material flaking from either the walls of the conduit 15 or the wire 16. However, in accordance with the present invention, means are provided within the guiding conduit 15 for minimizing the possibility of clogging or jamming due to any flaking which may still occur. In this regard, the tracking grooves 18 provide a plurality of voids or dead spaces which are continuously available throughout the full length of the coduit 15. Any flakes or other foreign matter which may gather within the conduit 15, during the passage of the wire 16 therethrough, will tend to accumulate in these grooves or spaces 18 where they may be stored without clogging or otherwise impeding the relative motion of the wire with respect to the guiding conduit.

Periodically, the guiding conduit 15 may be separated from the wire 16 to clean the interior of debris or, if the conduit 15 is to remain in continuous service, a suitable high pressure gas supply (not shown) may be applied to one open end of the conduit to blow out the debris stored within the spaces 18.

Referring now more particularly to FIGURES 2–7 of the drawings, a plurality of aperture configurations are shown to illustrate the various forms which the guiding conduit of the present invention may take, depending upon the shape of the wire to be conducted through the conduit.

Figure 2:
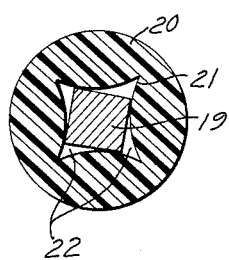
FIGURE 2 is a sectional view of a rectangular wire within a wire guiding conduit having a pincushion-type central aperture.

FIGURE 2 depicts a wire 19, of rectangular cross-section, positioned within a guiding conduit 20 having a pincushion-type central aperture 21 extending the length of the conduit. As in the case of the round wire within a triangular aperture shown in FIGURE 1, the rectangular wire 19 of FIGURE 2 will track with minimal frictional contact along the grooves of the aperture 21. Moreover, any debris or foreign matter will tend to accumulate in the various pockets or spaces of the conduit, such as at 22.

Figure 3:
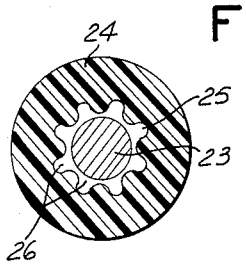
FIGURE 3 is a sectional view illustrating a guiding conduit having a ribbed central aperture for guiding wire.

FIGURE 3 illustrates a round wire 23 within a guiding conduit 24 having a ribbed or lobed aperture 25 for guiding the wire. Again, spaces 26 are provided within the conduit for the accumulation of debris.

Figure 4:
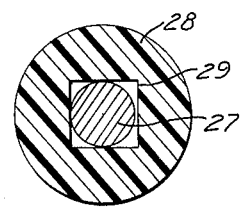
FIGURE 4 is a sectional view illustrating a circular wire within a guiding conduit having a rectangular central aperture.
Figure 5:
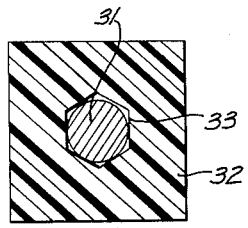
FIGURE 5 is a sectional view illustrating a rectangular guiding conduit having a hexagonal central guiding aperture.
Figure 6:
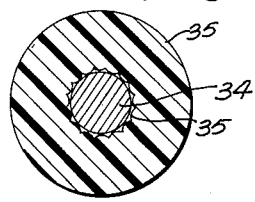
FIGURE 6 is a sectional view illustrating a guiding conduit having a scalloped central aperture.

FIGURE 4 depicts a round wire 27 positioned within a conduit 28 having a central aperture 29 of rectangular configuration. FIGURES 5 and 6 also depict round wires within guiding conduits 32 and 35, respectively. In this regard, the wire 31 in FIGURE 5 is conducted through a hexagonal aperture 33, whereas the wire 34 of FIGURE 6 is conducted through a scalloped aperture 36. However, it will be noted that the conduit 32 of FIGURE 5 has an outer configuration which is rectangular, as opposed to the circular configurations of the other guiding conduits shown in the drawings. FIGURE 5 thus illustrates that the outer configuration of the conduit 32 in no way influence the facility with which the wire 31 is guided within the aperture 33 and, therefore, the outer configuration of the conduit may assume any desired shape.

Figure 7:
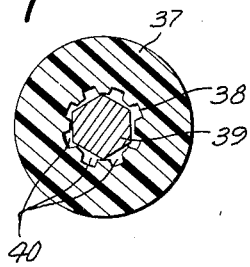
FIGURE 7 is a sectional view illustrating a guiding conduit having a channelled central aperture for guiding a wire of hexagonal cross-section.

FIGURE 7 shows a hexagonal wire 39 within a conduit 37 embodying a central aperture 38 having a channeled configuration. As in the instances of the round and rectangular wires previously described, the wire 39 tends to track, with minimal frictional contact, within the channels of the aperture 38. Consequently, the effort required to push or pull the wire through the aperture is considerably reduced, and any debris which is formed during the passage of the wire through the aperture will accumulate in the various channel spaces, such as at 40, where they cannot impede the motion of the wire.

FIGURE 8 depicts still another embodiment of the guiding conduit of the present invention which incorporates an aperture 40 of nonuniform cross-section for conveying a wire (not shown) through the conduit 41. The conduit 41 is shown as being dimpled or otherwise indented at various points along its external periphery, such as 42, 43, 44, 45, to provide a plurality of internal projections or protuberances 46 within the aperture 40. However, any method for producing the protuberances 46 within the aperture 40 may be employed, and the invention is not to be construed as limited to production of such protuberances solely by indentation of the external surface of the conduit 41.

The internal protuberances 46 may be located within the aperture 40 along the full length of the conduit 41 and may be in an arranged pattern or completely random as to shape and location. The provision of such protuberances in an aperture traversing the length of a guiding conduit functions in the same manner as the constant cross-sectional configuration apertures shown in FIGURES 1–7 of the drawings. Frictional areas of contact are similarly reduced and there is a tendency for the wire to track within the spaces between adjacent protuberances. Hence, the resistance to rotation of the wire about its own longitudinal axis is also enhanced by the conduit configuration of FIGURE 8. Moreover, debris tends to accumulate in the spaces between protuberances in the same manner as it does in the grooves of the various aperture configurations of FIGURES 1–7.

In FIGURE 8, the conduit 41 is shown to include a cylindrical mounting collar 47, of any suitable structural material, which may also be embodied into any of the guiding conduit structures shown in FIGURES 1–7, to facilitate handling of the conduits at either of their ends for mounting, wire intake or discharge purposes.

From the wire and guiding conduit arrangements shown in FIGURES 1–8, it may be observed that the general requirement for conduit apertures, in accordance with the present invention, calls for an aperture shape which may be either uniform or nonuniform along the length of the conduit, but which must be dissimilar to the shape of the wire to be conveyed through the conduit. Such dissimilarity of shapes between the conduit aperture and the wire to be conducted therethrough tends to reduce areas of frictional contact, with consequent lessening of the effort required to move the wire through the conduit. Moreover, such dissimilarity also provides the dead space necessary for the accumulation of debris in a manner such that the stored debris will not impede the motion of the wire through the conduit. Hence, aperture configurations, in accordance with the present invention, not only enable a reduction in driving effort for directing the wire through the conduit, but also significantly reduce the tendency of the wire to jam within the conduit.

Referring now to FIGURE 9, there is shown a conduit 49 embodying an aperture 51, in accordance with the invention, to enable a wire 48 to be guidingly conveyed through the conduit. The conduit 49 is shown as also embodying suitable means for the elimination of debris from the conduit as well as the lubrication of the wire 48 and conduit 49 as the wire passes through the aperture 51. A suitable lubricant (not shown) may be drawn into the conduit 49 through a lubricating orifice 52 extending through the wall of the conduit. It will be noted that the axis of the orifice 52 is tilted with respect to the vertical so that it extends more nearly in the same direction as the direction of flow followed by the wire 48 through the conduit 51. The effect of tilting the axis of the orifice 52 in this manner is to increase the tendency for the lubricant to be drawn into the conduit as the wire 48 proceeds therethrough. Such a lubricating arrangement is especially applicable for guiding conduits used in the mechanical control arrangements previously described.

The conduit 49 is also provided with an orifice 53 for the elimination of flakes or other foreign matter 54 emanating from within the conduit. In contrast to the orientation of the lubricating orifice 52, the debris eliminating orifice 53 is tilted to direct its axis against the direction of flow of the wire 48 as it passes through the conduit 49. In this manner, debris tends to be driven out through the orifice 53 rather than being drawn to the interior of the conduit.

The orifice 55 is conduit 49 is shown with its axis perpendicular to the direction of flow of the wire 48, and, therefore, may serve equally well for lubrication or debris elimination purposes. In this regard, the conduit 49 may take the form of a length of perforated tubing embodying a plurality of orifices, such as 55, which are interchangeably suitable for situations requiring lubrication intake as well as those primarily requiring flake or other debris elimination.

FIGURES 10 and 11 illustrate various discharge nozzle structures which may be utilized in conjunction with the wire guiding conduits previously described, and which are especially suitable for welding applications.

The arrangement of FIGURE 10 includes a guiding conduit 57 provided with an internal aperture 58 through which a wire 56 is directed. The conduit 57 is fitted into a tubular discharge nozzle 61 having an intake face 62 and an exit face 63. For welding purposes, the discharge nozzle 61 should be fabricated of an electrically conducting material, such as copper, copper-silver, or the like.

The intake side of the discharge nozzle 61 is recessed, as at 64, to accept the guiding conduit 57 which may be suitably secured thereto by any conventional means, as by the adhesive 65. Similarly, the discharge nozzle 74 in FIGURE 11 is provided with an exit face 77 and an entrance face 76 which is recessed at 78 to receive a guiding conduit 71 which is secured at 79. Furthermore, the discharge nozzle 61 of FIGURE 10 is provided with a threaded portion 66, and the discharge nozzle 74 of FIGURE 11 is provided with a flange or lip portion 82 for attachment to a suitable welding tool or other device.

In FIGURE 10, the grooves 59 of aperture 58 align with the grooves 68, of similar configuration, within the discharge nozzle 61 and thereby provide continuity of flow from the conduit the nozzle. However, the aperture 67, including the grooves 68, increases in diameter in proceeding from the conduit 57 to the exit face 63 of the nozzle 61. This arrangement facilitates the elimination of debris, such as 69, from the conduit and provides an unrestricted discharge opening for the wire 56.

In a like manner, the nozzle 74 in FIGURE 11 includes grooves 81 in alignment with the grooves 73 within the aperture 72 of the guiding conduit 71. However, in the embodiment shown in FIGURE 11, only the depth of the grooves 81 increases in diameter in proceeding from the guiding conduit 71 to the exit face 77 of the discharge nozzle 74. Hence, debris is more readily eliminated, yet the internal diameter of the aperture 75 remains substantially unaffected in size.

In utilizing the wire guiding conduits of the present invention, flake elimination may be further enhanced by blowing out the debris under gas pressure, as previously mentioned. This facility for passing gas through the conduit, while the wire is positioned therein, is of substantial value in the welding field, since it is desirable to pass such gases through the conduit spaces for either shielding or combustion purposes. Gases which pass through the spaces of the conduit in this manner are uniformly distributed about the periphery of the wire being conveyed.

Wire guiding conduits of the type herein described satisfy a long existing need in the various arts, such as welding and mechanical controls, for conductors which offer minimal frictional resistance to the passage of wire material therethrough and which eliminate the clogging and jamming difficulties encountered with the wire guiding conduits heretofore available.

It will be apparent from the foregoing that, while particular forms of my invention have been illustrated and described, various modifications can be made without departing from the spirit and scope of my invention. Accordingly, I do not intend that my invention be limited, except as by the appended claims.

I claim:
1. In combination with a flexible tubular wire guiding conduit having means within said conduit for encircling and interruptedly contacting a wire as it passes through said conduit, a nozzle for said wire guiding conduit comprising: a tubular sleeve coaxial with said conduit and having entrance and exit sections, said sleeve having a wire guiding aperture therein extending the length of said sleeve, a plurality of recesses in the walls of said sleeve adjacent to the coextensive with said aperture, the depth of said recesses increasing as they proceed toward said exit section; and means for securing one end of said conduit to said sleeve at the entrance section thereof.

2. The nozzle of claim 1 wherein said nozzle is fabricated of an electrically conducting material.

3. In combination with a flexible tubular wire guiding conduit having means within said conduit for encircling and interruptedly contacting a wire as it passes through said conduit, a nozzle for said wire guiding conduit comprising: a tubular sleeve coaxial with said conduit and having entrance and exit sections, said sleeve having a wire guiding aperture therein extending the length of said sleeve, a plurality of recesses in the walls of said sleeve adjacent to and coextensive with said aperture, said aperture increasing in size as it proceeds toward said exit section, the depth of said recesses remaining substantially constant with respect to said aperture; and means for securing one end of said conduit to said sleeve at the entrance section thereof.

4. The nozzle of claim 3 wherein said nozzle is fabricated of an electrically conducting material.

References Cited by the Examiner

UNITED STATES PATENTS

| | | | |
|---|---|---|---|
| 855,106 | 5/1906 | Hensel | 74—501 X |
| 1,588,142 | 6/1926 | Rohrbach | 174—74 |
| 1,593,367 | 7/1926 | Southworth et al. | 138—177 |
| 1,644,237 | 10/1927 | Christensen | 219—136 X |
| 1,743,506 | 1/1930 | Watson et al. | |
| 1,953,915 | 4/1934 | Burgett et al. | 219—136 X |
| 1,959,180 | 5/1934 | Stephans | 219—136 |
| 1,959,194 | 5/1934 | Chapman | 219—136 |
| 2,083,937 | 6/1937 | Begg | 74—501 |
| 2,375,614 | 5/1945 | Berger et al. | 138—118 X |
| 2,382,966 | 8/1945 | Arens | 74—501 |
| 2,432,641 | 12/1947 | Wilson | 138—177 X |
| 2,771,181 | 11/1956 | Montgomery et al. | 138—140 X |
| 2,817,003 | 12/1957 | Duzek | 219—130 |
| 2,821,092 | 1/1958 | Cordora et al. | 74—501 |
| 2,831,737 | 4/1958 | Jacoby. | |
| 2,871,718 | 2/1959 | Schroeder | 74—501 |
| 2,876,334 | 3/1959 | Wojciak et al. | 219—130 |
| 3,056,102 | 9/1962 | Cornell | 219—130 |
| 3,093,162 | 6/1963 | Reiling | 138—150 |
| 3,143,147 | 8/1964 | Sellars et al. | 138—140 |

OTHER REFERENCES

| | | |
|---|---|---|
| 469,399 | 5/1914 | France. |
| 627,402 | 3/1936 | Germany. |
| 523,820 | 7/1940 | Great Britain. |
| 208,259 | 4/1940 | Switzerland. |

BROUGHTON G. DURHAM, *Primary Examiner.*

DON A. WAITE, *Examiner.*